United States Patent
Sugiarto et al.

(10) Patent No.: US 6,278,449 B1
(45) Date of Patent: *Aug. 21, 2001

(54) APPARATUS AND METHOD FOR DESIGNATING INFORMATION TO BE RETRIEVED OVER A COMPUTER NETWORK

(75) Inventors: Basuki Afandi Sugiarto; Joe Zexuan Zhou, both of San Diego, CA (US)

(73) Assignees: Sony Corporation, Tokyo (JP); Sony Electronics, Inc., Park Ridge, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/146,855

(22) Filed: Sep. 3, 1998

(51) Int. Cl.[7] ............................... G06F 3/14; G06F 15/16
(52) U.S. Cl. .................... 345/334; 345/342; 345/335; 701/513; 701/515; 709/203; 709/219
(58) Field of Search ....................... 345/334, 333, 345/335, 342, 340, 346, 356, 329, 357, 302; 707/501, 514, 515, 517, 513; 709/217, 203, 219

(56) References Cited

U.S. PATENT DOCUMENTS

| 5,339,392 | * | 8/1994 | Risberg et al. | 345/333 |
| 5,627,977 | * | 5/1997 | Hickey et al. | 345/329 |
| 5,649,186 | * | 7/1997 | Ferguson | 707/10 |
| 5,781,189 | * | 7/1998 | Holleran et al. | 345/335 |
| 5,802,530 | * | 9/1998 | Van Hoff | 345/335 X |
| 5,894,554 | * | 4/1999 | Lowery et al. | 709/203 |
| 5,987,480 | * | 11/1999 | Donohue et al. | 707/501 |
| 6,026,433 | * | 2/2000 | D'Arlach et al. | 709/217 |
| 6,085,229 | * | 7/2000 | Newman et al. | 709/203 |

* cited by examiner

Primary Examiner—Raymond J. Bayerl
(74) Attorney, Agent, or Firm—Frommer Lawrence & Haug, LLP.; William S. Frommer; Gordon Kessler

(57) ABSTRACT

A system and method for designating and retrieving information over the internet. At least one webpage is accessed and individual portions of the at least one webpage are designated, each of the individual portions being associated with an underlying information content. The designated individual portions of the at least one webpage are positioned within a single configuration display screen and the format of the single configuration display screen including the designated individual portions of each webpage are stored in a configuration file. The configuration file and underlying information content associated with each of the designated individual portions are retrieved and positioned on an output display screen in accordance with the configuration file.

43 Claims, 10 Drawing Sheets

FIG. 8

APPARATUS AND METHOD FOR DESIGNATING INFORMATION TO BE RETRIEVED OVER A COMPUTER NETWORK

FIELD OF THE INVENTION

This invention relates generally to computer networks, and more particularly to the customizing of information for retrieval over a computer network.

BACKGROUND OF THE INVENTION

The advent of computer networks and the increasing amount of information that is available over these networks has given rise to a growing number of computer network users. Traditionally, the users gain access to computer networks through mainframe or desktop computers. However, in order to meet the varying needs of individual users, many alternative systems for accessing computer networks have been developed. For example, devices commonly known as "palm-top computers", which are not much bigger than cellular telephones, often come with internet access capability.

However, with the advent of these alternative access devices, in order to provide them at a low cost, and having a small overall size, the computing power of these devices has been reduced, and may be far less than is currently available on a fully operable desktop computer. Additionally, data transfer rates for portable devices, which may be wireless, may be substantially lower than that achievable through a direct access line as in a local area network, T1 line to the internet, or other direct modem connection. This reduced computing capability and reduced data transfer rate resulting in increased access time often results in extensive time periods waiting for information to be transmitted to or from such an alternative access device, and also renders the transmission or receipt of superfluous information, which is not necessary for the user, extremely undesirable.

Accordingly, designers of network access systems must consider how their systems will accommodate varying users and user access devices. That is, designers must consider how to gather and present network information given a user's needs and the capabilities of the user's access device. In one example, designers must consider how internet information—which is most commonly provided in the form of "web pages"—can be efficiently retrieved and displayed to meet a particular user's needs.

OBJECTS OF THE INVENTION

Accordingly, it is an object of the invention to provide an improved apparatus and method for determining information to be transmitted over a computer network so as to optimize the transmission process.

Another object of the invention is to provide an improved method and apparatus for formatting information received from various information sources for view by a user on a display apparatus.

A further object of the invention is to provide a network access system to allow users to customize the format and display of retrieved network information.

Yet another object of the invention is to provide a method and apparatus which allows users to specify the information to be received from the internet, and the manner in which this information will be displayed on a highly portable internet access device.

Still other objects and advantages of the invention will in part be obvious and will in part be apparent from the specification and drawings.

SUMMARY OF THE INVENTION

Generally speaking, in accordance with the invention, the improved information collection and dissemination apparatus and method is provided for obtaining information from various input sources, configuring this information in accordance with a predefined user format, and transmitting the information to a remote location. In a preferred embodiment the apparatus may collect information from various web pages from the worldwide web internet, configure this various information in accordance with a predefined user configuration file, defined by a particular user, and transmit the configured various information to a highly portable internet access device. The configuration file is created by the user and is stored in a centralized database server. This configuration file specifies the information the user would like to retrieve from the network and how that information is to be displayed. Such a configuration file may be generated by a user using the highly portable internet access device, or more preferably through a general, commercially available product which allows access to the internet and a particular website dedicated for the design of such configuration files.

When a user attempts to retrieve information from the network, the system server of the network responds to the user's request by uploading one or more request servicing software modules. The requesting user is then identified, and a predetermined user configuration file corresponding to the user making the request is loaded from the database server. The information requested by the user is formatted in accordance with the user's configuration file, and forwarded to the user's access device for display.

By providing network users with a simplified manner for designating a personalized information retrieval scheme, the invention allows each user to tailor the retrieval of information to the user's personal needs and to the capabilities of the user's network access device, thereby decreasing the time necessary for a user to obtain wanted information while reducing the amount of received, unwanted information.

The invention accordingly comprises the several steps and the relation of one or more steps with respect to each of the others, and the apparatus embodying features of construction, combinations of elements and arrangement of parts which are adapted to effect such step, or as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIGS. 8–10 show examples of web pages from which information is culled to form the exemplary personalized page of FIG. 7.

DETAILED DESCRIPTION OF THE PREFERRED EMBODIMENTS

Figure 1:
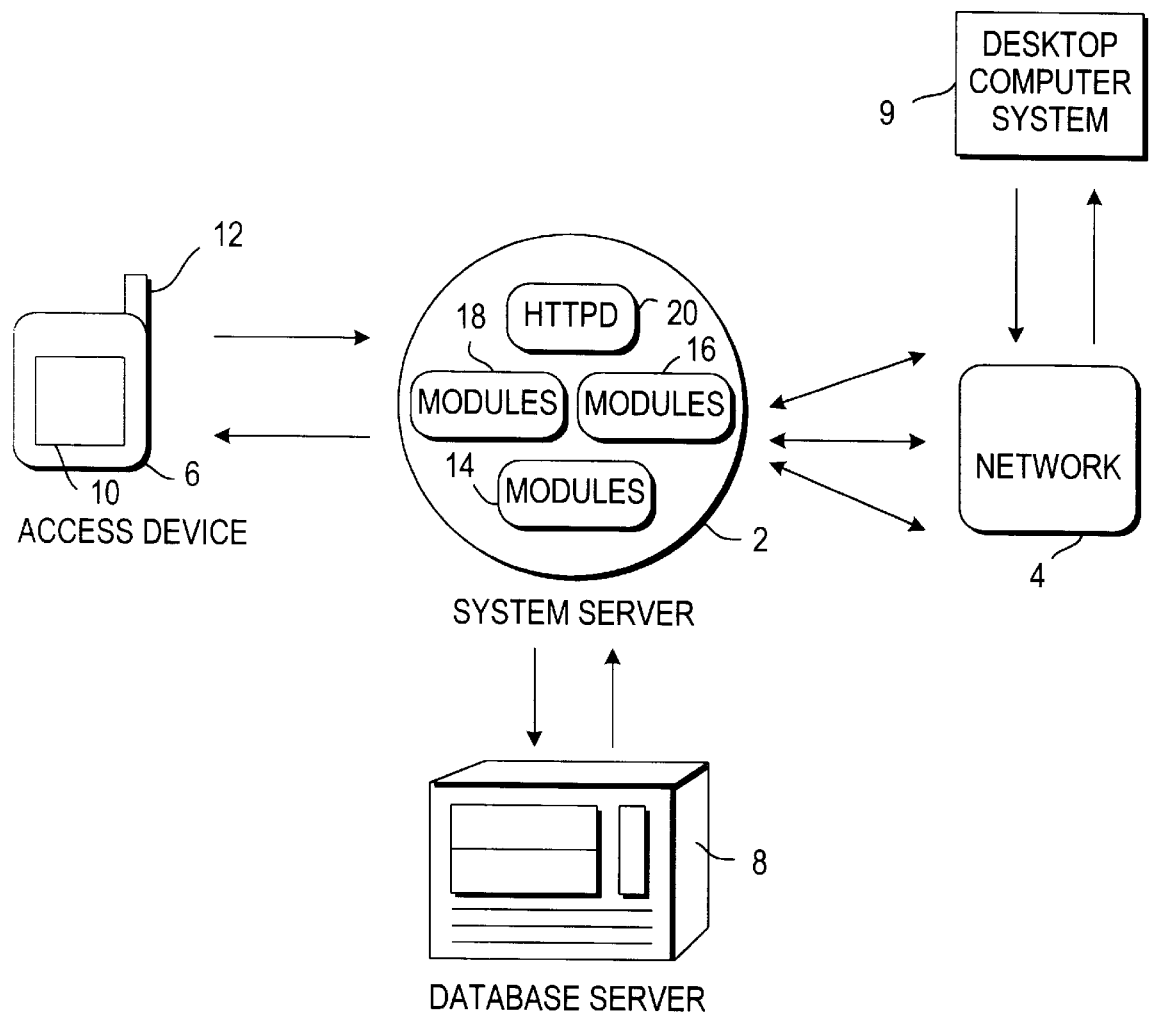
FIG. 1 shows an information retrieval system constructed in accordance with a preferred embodiment of the invention.

FIG. 1 shows an information retrieval system constructed in accordance with a preferred embodiment of the invention. The information retrieval system includes a system server 2 that is coupled to a computer network 4. The coupling of the system server and network may take many forms, for example, a telephone wire, a coaxial cable, a twisted-pair wire, a fiber optic link, and/or a wireless link. Also coupled to the system server are a user access device 6 and a database server 8. Like the network coupling, access device coupling and database coupling may take various forms. Finally, a desktop computer system 9 is coupled to computer network 4. This coupling may also take various forms.

User access device 6 may be a desktop computer, a laptop computer, a cellular telephone, a personal organizer, a palm-top computer, or any other device that is equipped for communication with system server 2. Although there are many possible embodiments that user access device 6 may take, for purposes of the following description user access device 6 will be considered to be a hand-held portable access device (e.g., a palm-top computer) and will be referred to as a handset.

Handset 6 depicted in FIG. 1 includes at least a display screen 10 and antenna 12. Display screen 10 may be used to display information retrieved from the network through system server 2, as well as information pertaining to the use of handset 6 itself, such as handset 6's battery level. Antenna 12 allows handset 6 to communicate with system server 2 when the two are coupled by a wireless link or the like.

Database server 8 may comprise any system capable of electronically storing data including, but not limited to systems that store data on optical disks, magnetic disks, and magnetic tape. In accordance with the preferred embodiment of the invention, database server 8 will be utilized to store various user configuration files as will be described below.

Network 4 of FIG. 1 may be the internet, a local area network (LAN), or any other network that enables a transfer of data. For purpose of describing the preferred embodiment of the invention, the network will be presumed to be the internet. Furthermore, the description will be focused on the world-wide-web aspect of the internet. Accordingly, to facilitate understanding the invention it should be noted that the current world-wide-web operation groups information into "web pages"; and that the standard format for such pages is the "HTML" format, which enables a web user to create "hypertext links" through the "HTTP" protocol.

System server 2 is central to the invention's operation. It is depicted in FIG. 1 as being a collection of software modules 14–20. These modules may be software modules which reside within a single computer, or alternatively, may be distributed among multiple computers. Module 20 is an "HTTP" daemon which runs in the background of the system and controls software and which is capable of enabling access to HTTP facilities. Modules 14, 16 and 18 are request-servicing modules. When the daemon receives an information request, it uploads into module 20, one of the request-servicing modules 14 and the uploaded module then carries out the processing necessary to honor the request.

Finally, a desktop computer system 9 may access system server 2 through network 4. In the preferred embodiment, network 4 acts as the internet, and then therefore a desktop computer system 9 may access system server 2 through this internet communications link. Through this access, a user using desktop computer system 9 is able to construct and define configuration files within system server 2, which are then stored on database server 8.

Operation of the system will now be described in detail. Personalized information retrieval according to the preferred embodiment of the invention is enabled through the use of various configuration files. Through the use of desktop computer system 9, each system user may generate any number of configuration files, each of which is stored in database server 8. Each of these configuration files specifies what information the user would like to retrieve and how the retrieved information is to be formatted. Thus, for example, a user may want to retrieve information from three different internet pages, the CNN web page, the ESPN web page and the NASDAQ web page. Further, the user may want to retrieve only specific information from each page, and may want all the information retrieved from the pages to be formatted such that it can be displayed within one display screen 10 of handset 6. That is, the user may want "Headline News" from the "CNN" page, particular stock quotes from the NASDAQ page, and the latest score for a particular sports team from the ESPN page, and may want these items displayed simultaneously on display screen 10 of handset 6. Accordingly, the configuration file is created/edited to retrieve and format the specified CNN, NASDAQ and ESPN information, and the configuration file then is stored in database server 8.

Figure 7:
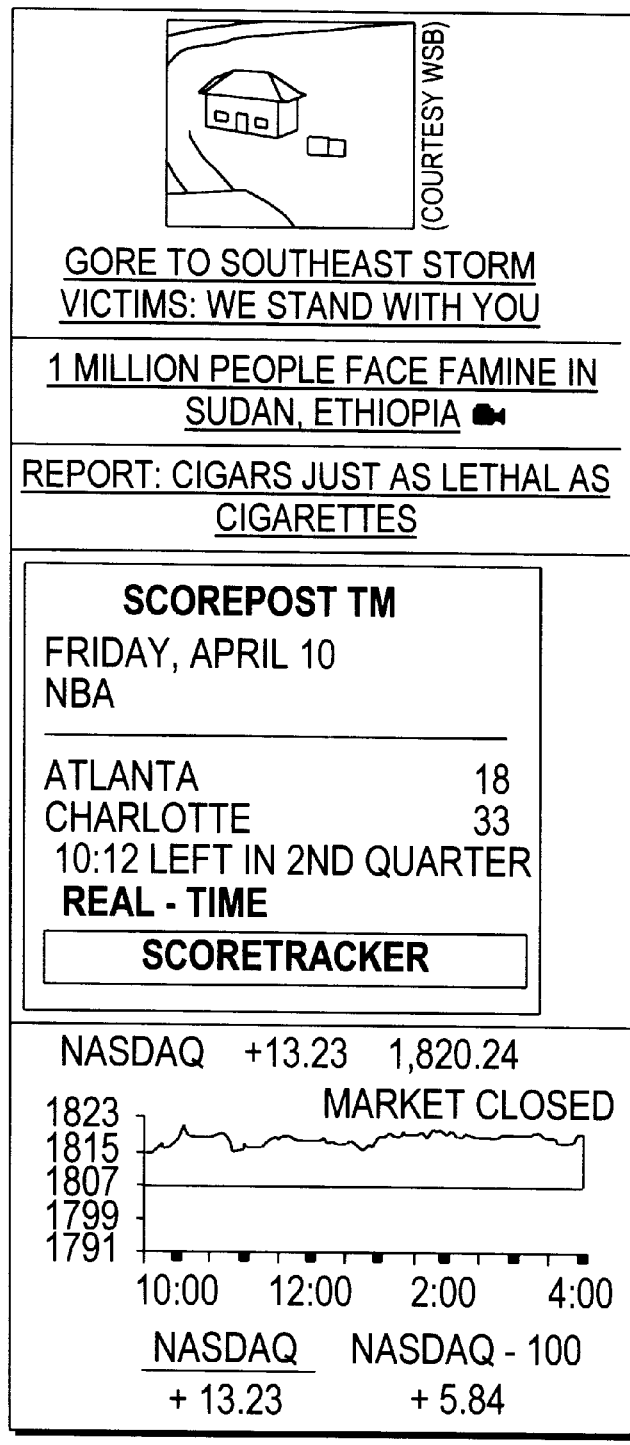
FIG. 7 shows an example of a "personalized page" in accordance with the present invention.
Figure 8:
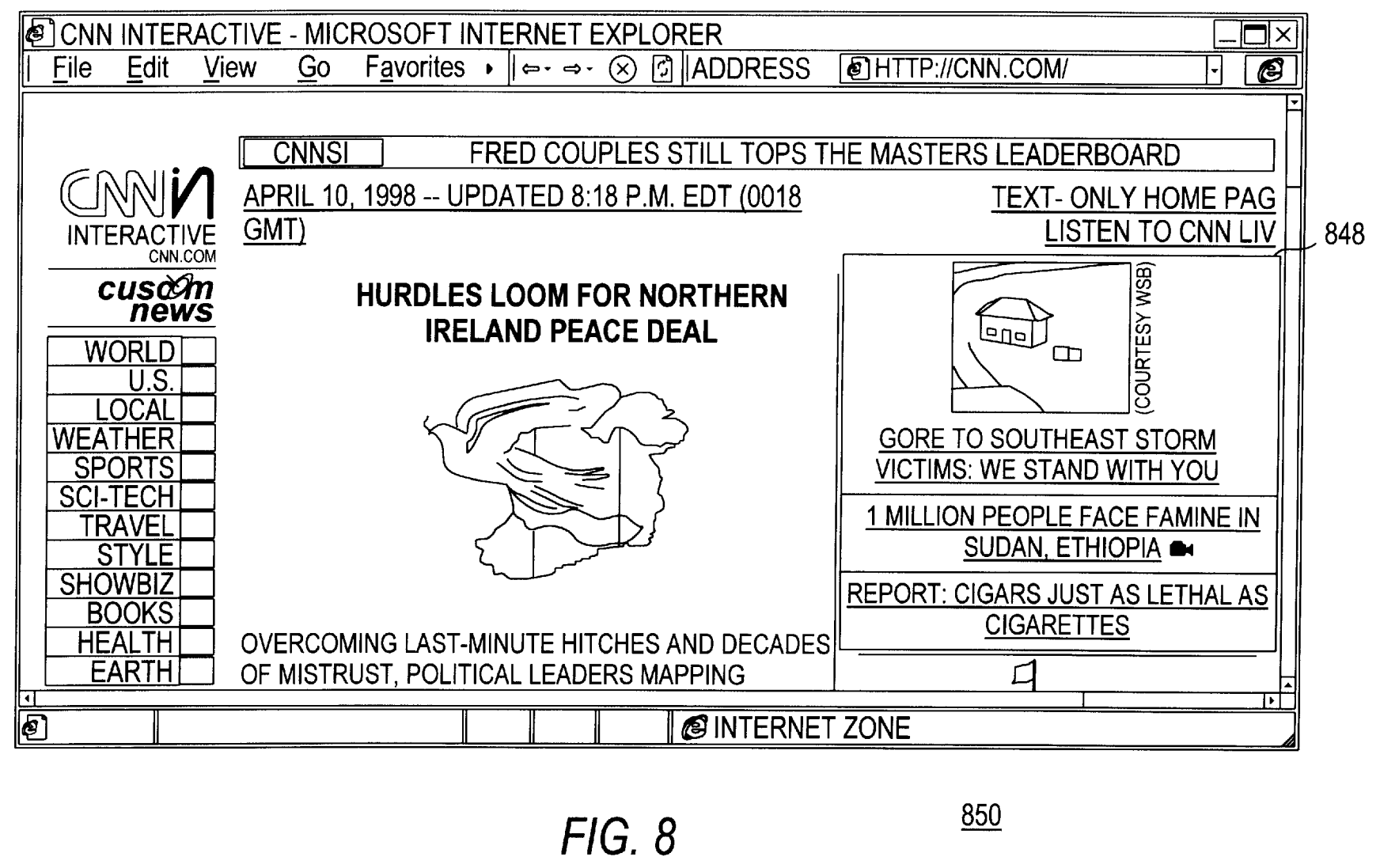
Figure 9:
Figure 10:
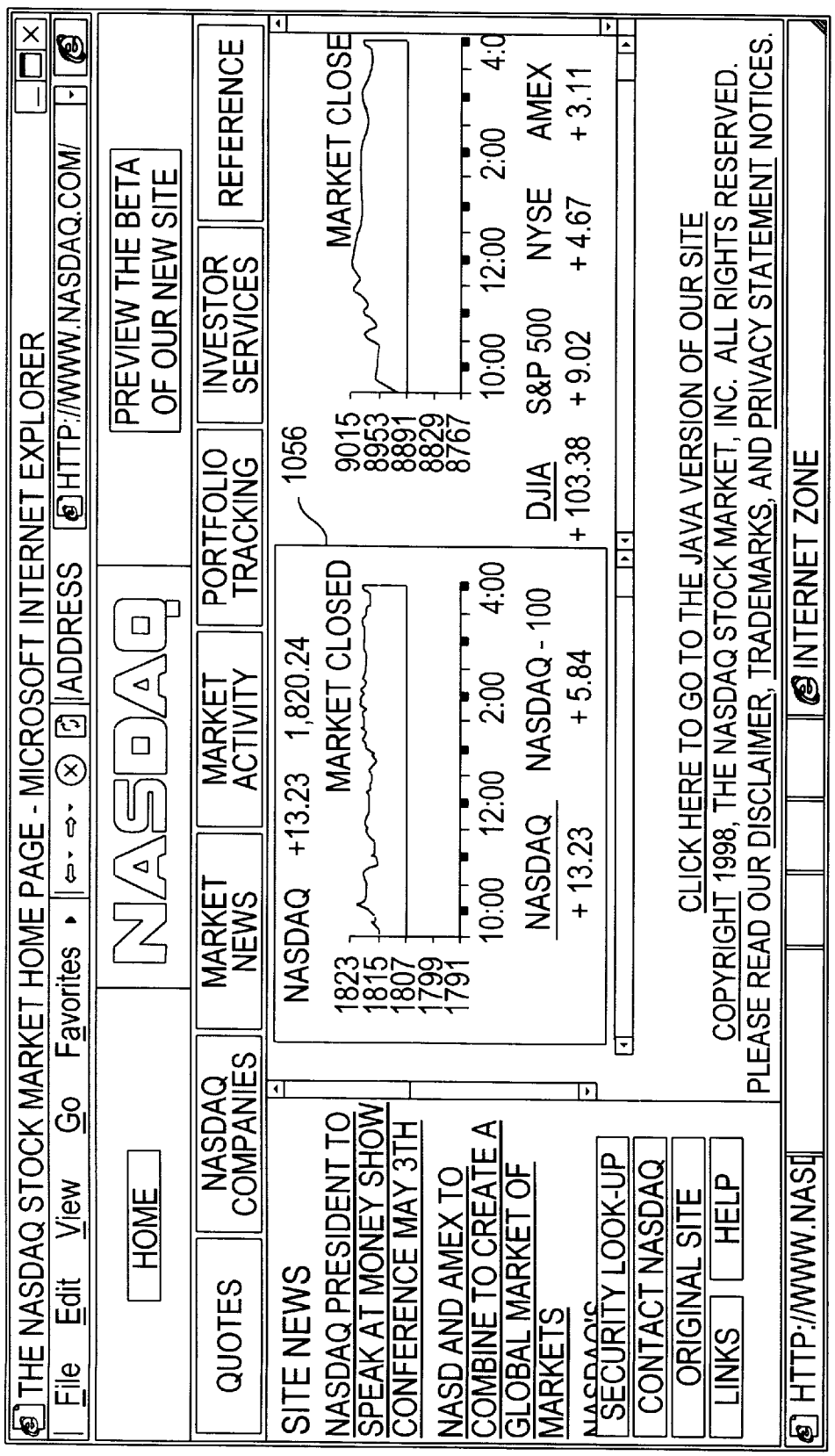

An example of a formatted (or "personalized") page that may be displayed on display screen 10 of handset 6 in accordance with the invention is shown in FIG. 7. The formatted page of FIG. 7 incorporates information from three different web pages, a CNN web page (illustrated in FIG. 8), an ESPN web page (illustrated in FIG. 9) and a NASDAQ web page (illustrated in FIG. 10). As can be seen from the figures, the formatted page 740 is made up of three portions, a CNN portion 742, an ESPN portion 744 and a NASDAQ portion 746. These portions are culled from their respective web pages. That is, the CNN portion 742, ESPN portion 744 and NASDAQ portion 746 of the formatted page correspond respectively to portion 848 of CNN web page 850, portion 952 of ESPN web page 954 and portion 1056 of NASDAQ web page 1058—the layout and content of the formatted page having been determined according to the configuration file creation/editing operation which will now be described.

Any configuration file associated with a particular user may be created and/or edited by the user, or by a particular service provider. In either case, in addition to creating or editing this configuration file with desktop computer system 9, handset 6 may also be used for creation or editing.

Figure 2:
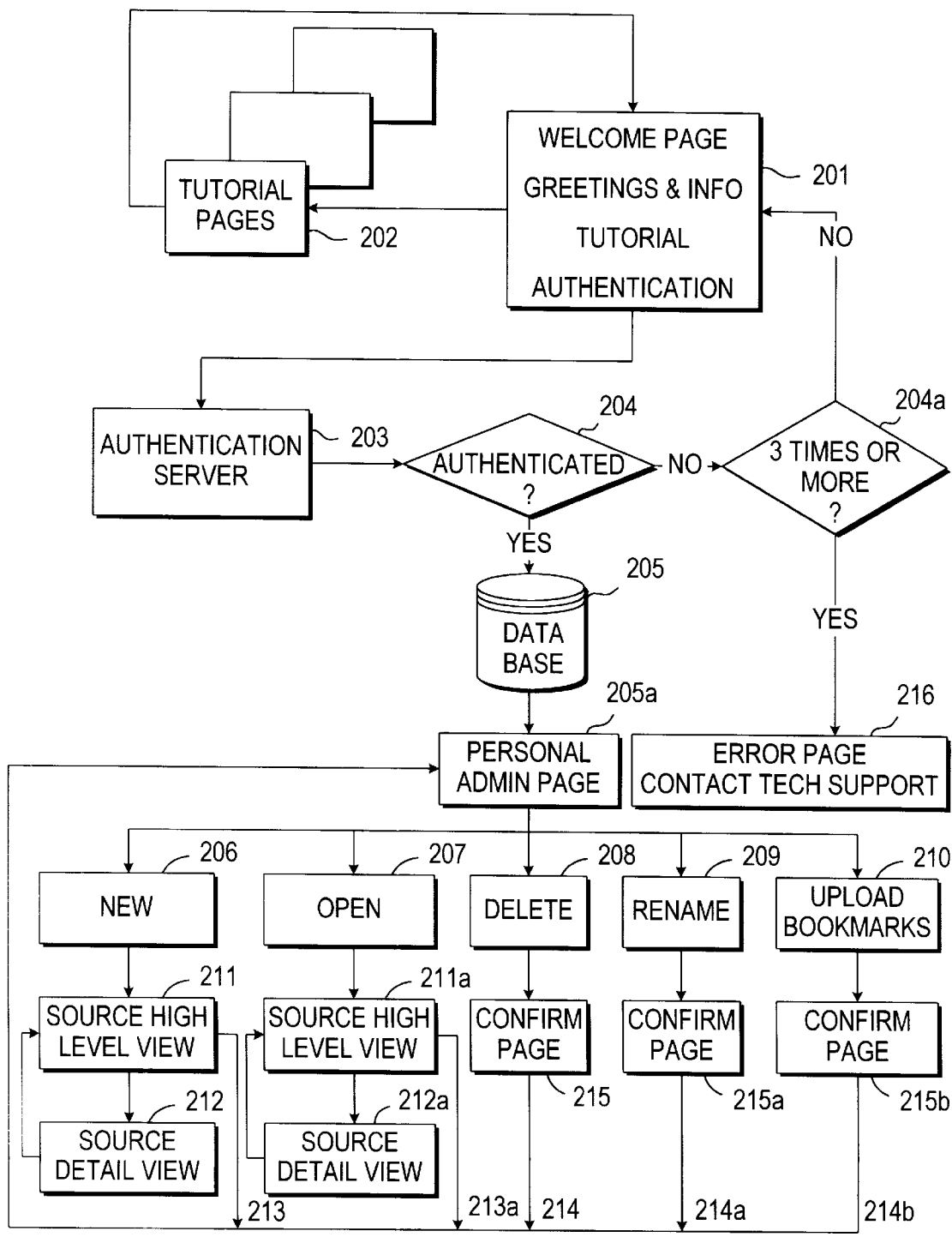
FIG. 2 is a flow chart diagram depicting various steps through which a user may proceed in order to edit a configuration file in accordance with the invention.

The method of using desktop computer system 9 for the creation, editing and other manipulation of configuration files will now be described. As is shown in FIG. 2, when a user enters the appropriate program for manipulating configuration files, which is preferably maintained on a specific website within the internet, the user is first greeted by a welcome page 201. Welcome page 201 contains greeting information, and the ability to access the tutorial screens, or enter the authentication section of the cite. If a user wishes to view the tutorial, control proceeds to tutorial pages 202, which preferably provide an interactive tutorial for a user in order to become familiar with the use of the website and how to generate and edit configuration files. Upon completion of tutorial pages 202, control is returned to welcome page 201. Thereafter, if the user wishes to manipulate any configuration files, the user selects authentication from the welcome page.

Authentication is the doorway to the application for valid subscribers to the service. Upon selection of the authentication choice from welcome page 201, control passes to authentication server 203, in which a user is challenged with a user name and password screen. Subscribers of the service must provide a user name and password in order to enter the system. This material is entered at authentication server 203, and a decision is made of whether a proper user name and associated password have been entered at step 204. If not, control passes to step 204a in which it is determined whether this authentication process has failed three or more times. If not, control passes once again to welcome page 201, where a user may once again try to authenticate. If at step 204a it is determined that authentication has failed three or more times, control is forwarded to error page 206 and the user is instructed to contact technical support to correct any errors or to subscribe to the service.

If at step 204 authentication succeeds, the user name and password entered at authentication server 203 are used to obtain access to database 205 which contain information regarding a particular user's profile. Database 205 is maintained on database server 8 of FIG. 1. Information such as the user's real name, device bookmarks, various associated configuration files and various network links are extracted from the database and used to dynamically build the user's personal administration page at step 205a. The dynamic generation of this personal administration web page is important since the information thereon may change based upon an editing session by a user, or based upon service provider changes, or changes by any other authorized entity.

Figure 4:
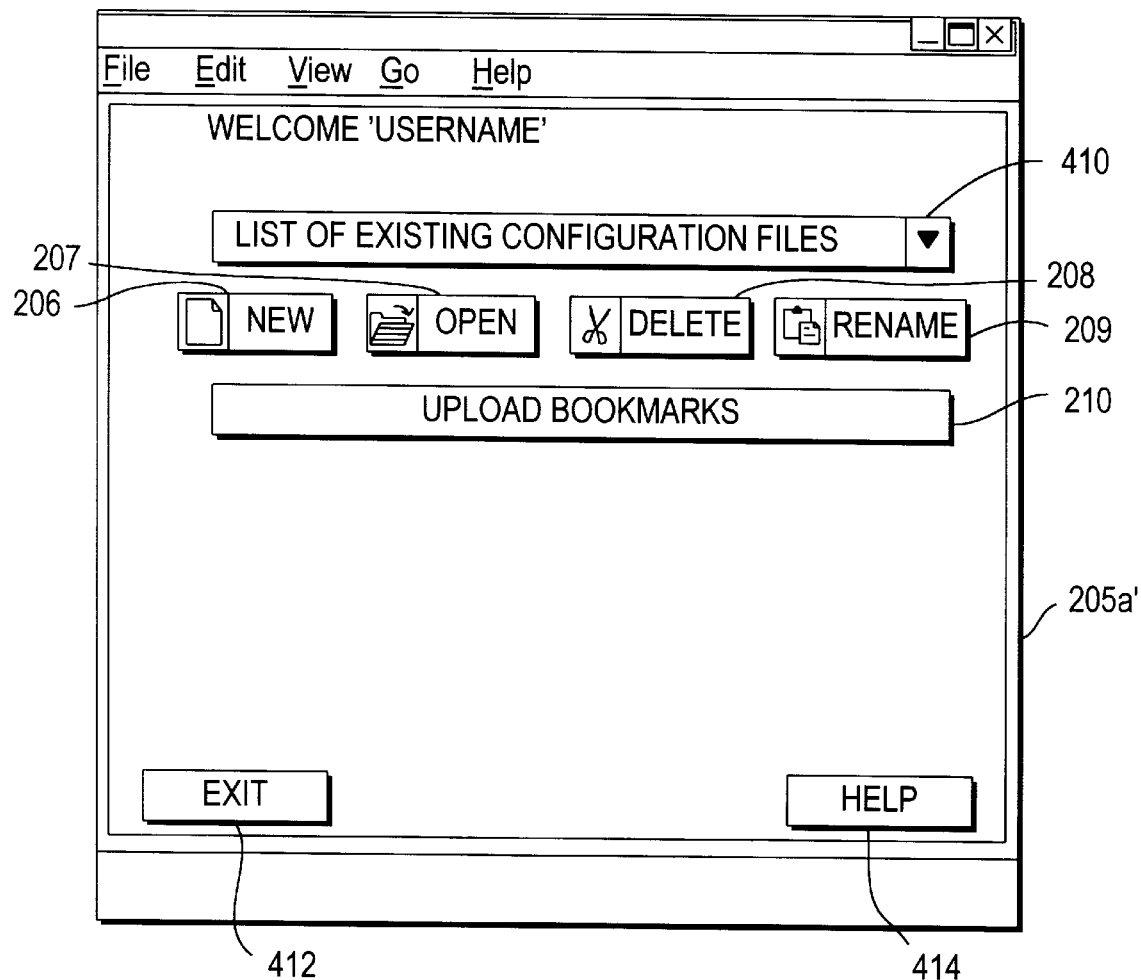
FIG. 4 shows an example of a display screen displaying a personal administration screen according to the invention.

A personal administration page constructed at step 205a, is shown in the preferred embodiment as depicted in FIG. 4. A personal administration page 205a' comprises a list of existing configuration files 410, which is configured in a pull-down menu format. As is further shown in both FIGS. 2 and 4, personal administration page 205a' includes choices for generating a new configuration file 206, opening an existing configuration file 207, deleting an existing configuration file 208, and renaming an existing configuration file 209. An upload bookmarks choice 210 is also provided which allows a 30 user to upload bookmarks from the user's web browser, such as those known commercially as Netscape or Microsoft Internet Explorer, and allows a user to incorporate these bookmarks into various configuration files. Finally, a user is provided with an exit choice 412 for exiting the program and website all together, and a help button 414 for providing various on-line help features.

Figure 5:
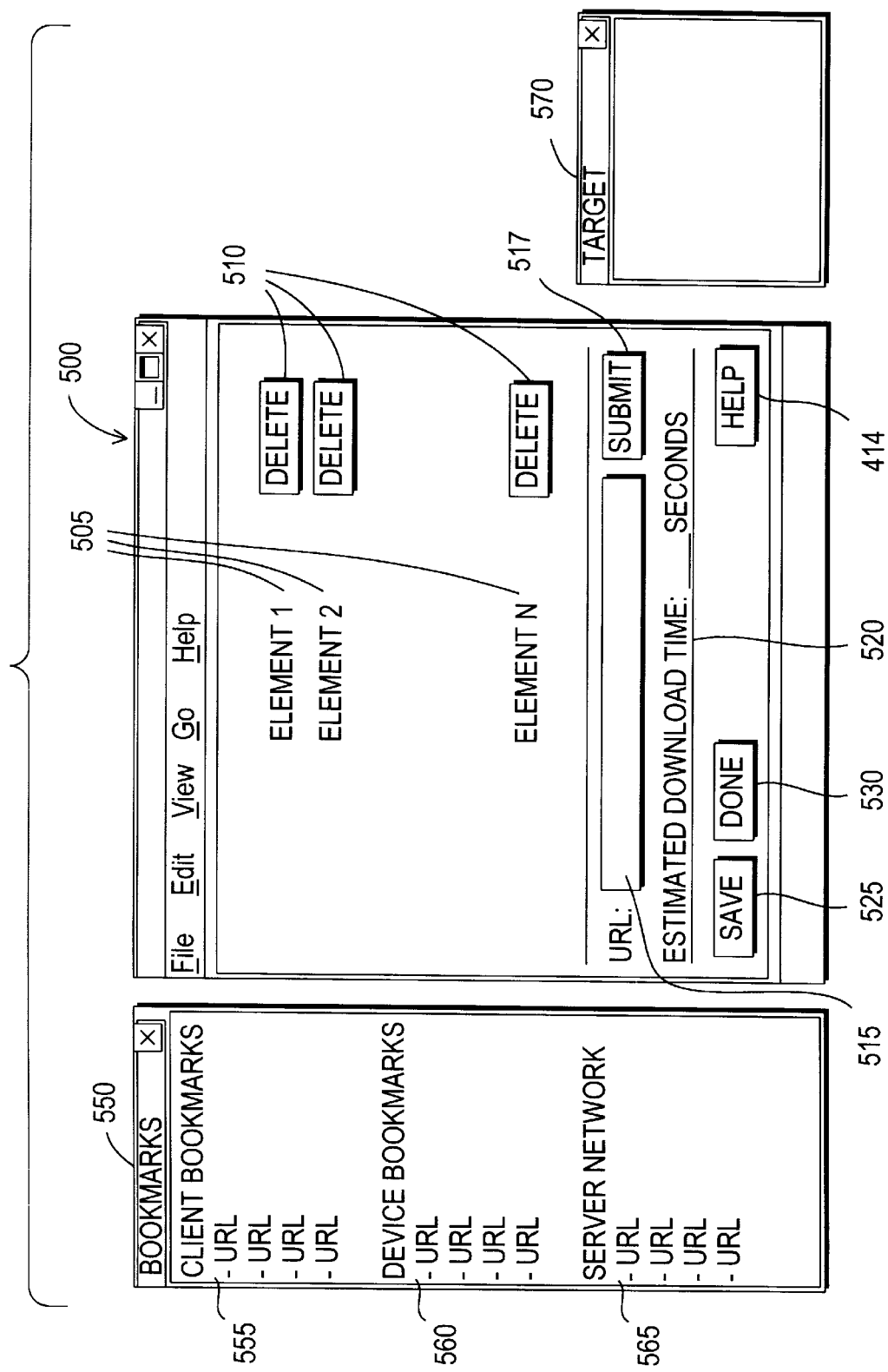
FIG. 5 shows an example of a display screen displaying a source level high view for constructing a configuration file in accordance with the invention.

Referring once again to FIG. 2, when a user selects the new selection 206, control passes to source high level view 211, and the user is shown a screen such as that depicted in FIG. 5, in a preferred embodiment. FIG. 5 includes a web page editing screen 500, a bookmark listing 550, and a target screen 570. In web page editing screen 500, a user enters a website address in a URL portion 515, and then selects the submit button in order to access the website for use. This request is then transmitted from desktop computer system 9, through internet network 4 to system server 2 as shown in FIG. 1. System server 2 then retransmits this request back to internet network 4, and accesses the requested web page. In addition to identifying a web page at URL portion 515, a user may select a particular web page from bookmark section 550. Bookmark section 550 includes a plurality of bookmarks 555 set by a user at desktop computer system 9, a plurality of bookmarks 560 set by a user at handset 6, and a plurality of bookmarks 555 set in accordance with system server 2 by the operator thereof. In order to select any of these websites, the user simply needs to select the appropriate bookmark, and the website will automatically be accessed.

Upon accessing the web page, the website is broken down into its component portions by system server 2 and is transmitted back to desktop computer system 9. As is shown in the main portion of website editing page 500, these portions are listed, element by element 505, so that they may be incorporated by the user into a unitary editing screen. A target screen 570 is a simulation of display screen 10 of handset 6, and depicts what a user will actually see in real size thereon. Thus, if each of elements 1, 2, . . . n is selected, the actual picture of these elements is depicted in target screen 570. Additionally, in order to remove an element from target screen 570, a user may select one of the delete buttons 510 associated with that element. Thus, in this manner, a user may select various portions of one or more websites to be included in the target screen 570. After completing the generation or editing of a particular configuration file, an estimated download time portion 520 indicates the amount of time it is estimated it will take to download this information to handset 6 upon its request. Finally, a user may save an edited configuration file by selecting save button 525, may exit the configuration screen and return to personal administration page 205a by selecting done button 530, and may obtain help by selecting help button 414.

Figure 6:
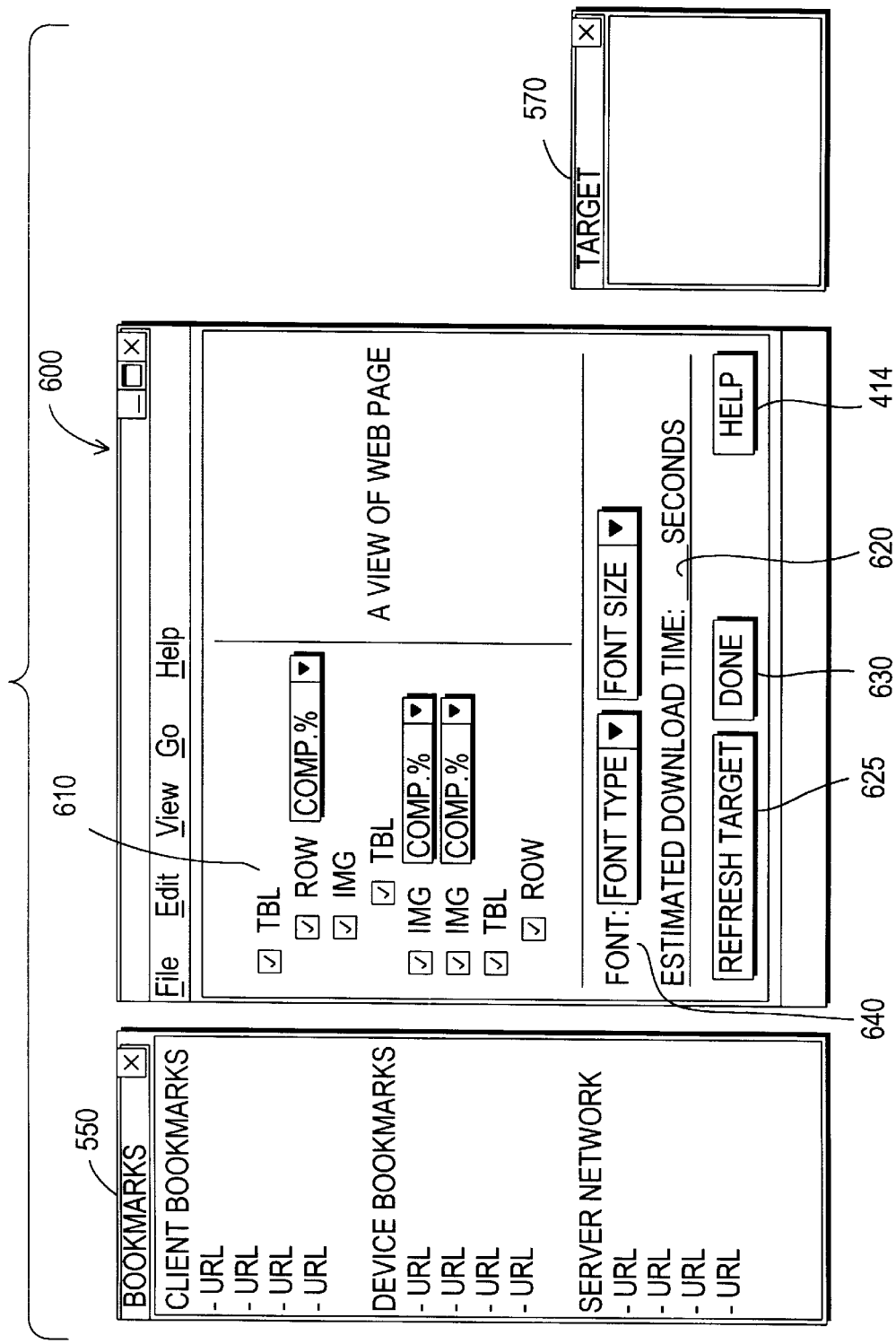
FIG. 6 shows an example of a display screen displaying a source detail view for constructing a configuration file in accordance with the invention.

If, after selecting various web page elements to be included in a particular configuration file, a user wishes to further edit and manipulate these elements, control is passed to source detail view 212 (see FIG. 2), and a display such as that shown at FIG. 6 is depicted to the user. Such advance features might be accessed by a user if the estimated download time is too long, or for other reasons.

As is shown in FIG. 6, a viewing page 600 replaces website editing page 500, while the remainder of the screen depicted to a user at source detail view 212 continues to include bookmark section 550 and target display 570. Web page viewing screen 600 allows a user to utilize various aspect choices 610 in order to provide different compression ratios for any selected portion of the web components in the configuration file. By providing for different compression ratios for various portions of the information to be downloaded, a user can reduce the estimated download time to within a reasonable manner. In order to further reduce the download time, the user may utilize font choice 640 in order to select different fonts and font sizes in order to speed up the estimated download time. Additionally, a refresh target button 625 is provided so that after changing various compression ratios and the like, a user can review in target screen 570 a simulation of what the information on display 10 of handset 6 will look like to insure that quality has not been degraded to too great a degree. A user may exit the screen and return to source high level view 211 by actuating done button 630, or may obtain help by actuating help button 414 as noted above. Thus, a user may select various portions from any number of websites, incorporate them into a single configuration file which then is saved in database 205 by system server 2 on database server 8, for future use.

Referring once again to FIG. 2, from personal administration page 205a, a user may also select an open step 207, which opens an existing configuration file. The existing configuration file is open in source high level view 211*a*, and may also be opened in source detail view 212*a*. These screens operate similarly to source high level view 211 and source detail view 212 as noted above, except that rather than starting with an empty configuration file, the existing configuration file is displayed upon entering the screen.

From personal administration page 205*a*, a user may also select a delete step 208, which allows a user to delete a selected configuration file. Upon selection of delete step 208, a confirmation page 215 requires a user to confirm the deletion of a selected configuration file. Upon confirmation, the file is deleted from data base 205 on database server 8.

From personal administration page 205*a*, a user may also select a rename step 209, in which case the name of an existing configuration file is changed to a new name. At confirmation page 215*a*, a user is asked to confirm the new name of the selected configuration file, and this new name is associated and saved with the configuration file in database 205 on database server 8.

Finally, from personal administration page 205*a* a user may request an uploading of new bookmarks at step 210. As noted in FIGS. 5 and 6, these uploaded bookmarks reside in client bookmark section 550. Upon uploading of these bookmarks, a user is asked to confirm that he wishes these bookmarks to be saved, and thereafter these bookmarks are saved at database 205 on database server 8. Thus, through the use of desktop computer system 9, a user is able to generate, edit, and otherwise manipulate configuration files, which are then stored by database server 8 for future use.

While one specific format for editing the configuration files has been shown, there are several programming technologies that may be used to perform configuration file editing. Among them are the commercially available programs known as: Netscape Navigator Plug-Ins, which provide a plug-in module that is embedded within the navigator browser; Netscape Composer Plug- Ins, which provide a plug-in module embedded within Netscape Composer; Microsoft Active X, which provides complete programming control for windows applications; and Dynamic HTML. Any of these technologies may be used to design a configuration file and that will allow users to modify the "look and feel" of their personalized information retrieval file. As shown above, the configuration file has a WYSIWYG (what you see is what you get) feature, as is depicted in part in the target screens.

In addition to editing, generating or otherwise manipulating configuration files via desktop computer system 9, it is possible to perform similar manipulations using handset 6 (or to provide similar graphical interface technology on desktop computer system 9 or other access device). Thus, the above-mentioned procedure and screens may be accessed through handset 6. The functionality of the desktop is provided to the user through handset 6.

Figure 3:
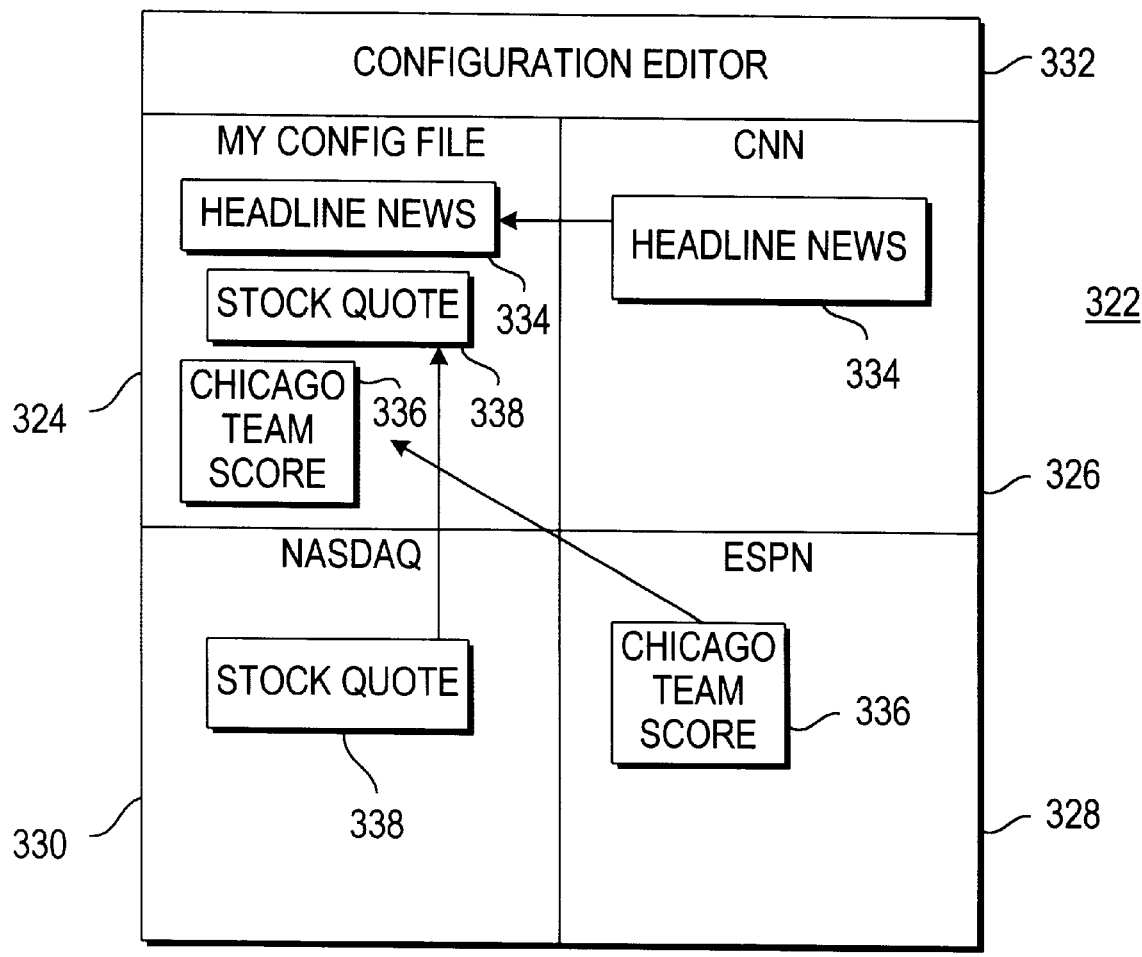
FIG. 3 shows an example of a display screen that may be used during configuration file editing according to the present invention.

In an alternative embodiment, a modified display for handset 6 may be provided. FIG. 3 shows a display screen 322 of a configuration file editing platform for handset 6 using WYSISYG (What You See Is What You Get) type editing in accordance with this alternative embodiment. The screen is divided into five portions 324, 326, 328, 330 and 332. Portion 332 is a screen header which includes general information, such as an indication that the screen pertains to a configuration editor. Portions 324–330 are used to provide "drag and drop" style editing by letting the user drag and drop images, HTML tables, hypertext links, applets, etc. from one portion of display screen 322 to another. More specifically, the user may select particular items from portions 326, 328 and 330, which represent the contents of various previously selected web pages, and may drag and drop the items into portion 324, which represents the contents of the user's configuration file. In the illustrated embodiment, the user may edit the configuration file by selecting item 334 (headline news) from the CNN portion of display screen 322 and dragging and dropping it in the configuration file portion;

selecting item 336 (Chicago team score) from the ESPN portion and dragging and dropping it in the configuration file; and selecting item 338 (stock quote) from the NASDAQ portion and dragging and dropping it in the configuration file. As an added feature, configuration file portion 324 of screen 322 may be set to the full size of display screen 10 of handset 6 so that the user can see how the display will look following an actual information retrieval.

Upon completion of configuration file editing by desktop computer system 9, by handset 6, or by another access device, as shown in FIG. 3, the configuration file is transmitted to system server 2 to verify any hypertext links that are embedded in the file. Once all hypertext links are verified, system server 2 stores the configuration file in database 205 on database server 8. If the hypertext links are not verified, system server 2 notifies the editing platform (either desktop computer system 9 or handset 6) that one or more hypertext links could not be reached (e.g., an internet web server may be located behind a corporate fire wall and thus is not accessible). Once the configuration file is stored in database server 8, the system is prepared to honor information requests utilizing this configuration file.

The user may initiate an information request through the use of handset 6 of FIG. 1, or alternatively through desktop computer system 9. However, normally a user will utilize handset 6 at a remote location for such a request. Handset 6 may provide this function via a "pulldown", menu that opens up a hypertext link connection to system server 2 through HTTP protocol. For instance, access device 6 may open up the connection by using a special flag, such as "HTTP:// access.domain/pir" (the "pir" standing for "personal information request",). Alternatively, handset 6 may open the connection by using a unique IP address. In any event, the user is responsible only for opening a personalized information request connection and for receiving the information as specified in the user's configuration file. The remainder of the necessary processing is performed by the system, and not on handset 6, which may have more limited computing power.

As mentioned above, the system server 2 includes an HTTP daemon which runs in the background of the system control software and functions to recognize and service user information requests. After a user has been authenticated, when system server 2 recognizes a request through the daemon, it uploads the appropriate request-servicing software module to handle the request (elements 14, 16 and 18 of FIG. 1) such as a web browser if searching for web pages or an editor for editing configuration files by way of example, identifies the requesting user, and retrieves the user's configuration file from database server 8. Depending on the information contained in the user's configuration file, the uploaded module opens the appropriate HTTP connection, fetches the appropriate web pages from the internet, and selects the appropriate predefined portions therefrom, and formats them into a single page in a predefined user format in accordance with the configuration file that is viewable on display screen 10 of handset 6. Finally, this formatted page is transmitted to handset 6 for viewing by the user, and the uploaded module notifies the HTTP daemon that the request has been honored. Alternatively, rather than providing individual software modules, integrated software may be used to provide similar functionality.

There are several Web Proxy server technologies suitable for implementing the daemon-module of the system server. These include at least those known commercially as the Netscape Web Proxy Server, Spyglass Prism, and Apache.

By implementing the invention through a daemon-module scheme as opposed to a common gateway interface (CGI) scheme, several benefits are realized. For one, the modules of the present invention may be made substantially smaller than comparable CGI software, thereby conserving system memory. Also, since the modules are smaller than comparable CGI software and are integrated within the HTTP daemon, they can be uploaded from their storage location to the computer in which they run in less time than it would take to upload the comparable CGI software. Moreover, the modules can be uploaded at any time, even if there are no requests, and they do not have to be shut down following a request. Thus, the modules can be kept at the ready in memory and the process speed throughout can be increased. Still another benefit is that various types of modules can be inserted into the HTTP daemon, such as modules that perform web statistic analysis, web censorship, image conversion and encryption.

It should be noted that the user is not limited to viewing only a single formatted page (e.g. the formatted page depicted in FIG. 3 as element 324). For instance, once a formatted page is received, the user may select (or "click on",) one of the items in the page (e.g. FIG. 3, item 334 "headline news") to request additional information concerning that item. An example of how to provide such a service is to include hypertext links in the information of a formatted page. The user can then use the hypertext links to request display of additional web pages containing information supplementary to the information of the formatted page. An alternative approach to providing this service is to respectively link one or more items in the formatted page to one or more second formatted pages in a hierarchical manner. Thus, for example, a user may create a second formatted page including items such as "headline financial news", "headline sports news", and "headline science news", and thereafter the second formatted page is retrieved in response to a selection of "headline news" in the first formatted page. Of course, it is possible to link any second formatted page to one or more third formatted pages, and so on.

It will thus be seen that the objects set forth above, among those made apparent from the preceding description, are efficiently obtained and, since certain changes may be made in carrying out the above method and in the constructions set forth without departing from the spirit and scope of the invention, it is intended that all matter contained in the above description and shown in the accompanying drawings shall be interpreted as illustrative and not in the limiting sense.

It is also to be understood that the following claims are intended to cover all of the generic and specific features of the invention herein described and all statement of the scope of the invention which, as a matter of language, might be said to fall therebetween.

What is claimed:

1. A system for designating and retrieving information over a computer network, comprising:

means for designating individual portions of a plurality of screens accessible over said computer network and maintained at diverse locations including an underlying information content associated therewith;

means for positioning said designated individual portions of said plurality of screens within a single display screen;

means for storing indicators indicative of the location of current and future updated information corresponding to said designated individual portions in a configuration file at a centralized location; and means for retrieving said configuration file at a location positioned apart from said centralized location, wherein said current and future updated information corresponding to underlying information content associated with each of said designated individual portions is retrieved and displayed on a display screen in accordance with said configuration file, said underlying information content corresponding to said indicators being retrieved and updated from over said computer network each time said configuration file is retrieved.

2. The system of claim 1, wherein said plurality of screens are webpages downloaded from the world wide web via the internet.

3. The system of claim 1, wherein said means for retrieving said configuration file is a wireless handheld device.

4. A system for designating and retrieving information over the internet, comprising:

means for accessing a plurality of web pages;

means for designating individual portions of said plurality of web pages maintained at diverse locations, each of said individual portions being associated with an underlying information content;

means for positioning said designated individual portions of said plurality of web pages within a single configuration display screen exhibiting a format;

means for storing the format of said single configuration display screen including indicators indicative of the location of current and future updated information corresponding to said designated individual portions of said at least one webpage in a configuration file at a centralized location;

means for retrieving said configuration file at a location positioned apart from said centralized location;

means for retrieving and updating current and future updated information corresponding to said underlying information content associated with each of said designated individual portions and corresponding to said indicators from over the internet each time said configuration file is retrieved; and means for positioning said designated individual portions and said associated underlying information content in accordance with said configuration file on an output display screen.

5. The system of claim 4, wherein said configuration display screen resides on a desktop computer system.

6. The system of claim 4, wherein said output display screen comprises a display screen on a wireless handheld access device.

7. The system of claim 4, wherein said configuration file is stored on a central server separate from said configuration display screen and said output display screen.

8. The system of claim 4, further comprising means for including world wide web hypertext links within said configuration display screen.

9. The system of claim 8, wherein said hypertext links allow a user to access additional world wide web information.

10. The system of claim 4, further comprising means for including links within said configuration display screen to provide access to at least one further user-defined configuration display screen in a hierarchical manner.

11. The system of claim 10, wherein the format of said at least one further user-defined configuration display screen is maintained within said configuration file.

12. The system of claim 10, wherein the format of said at least one further user-defined configuration display screen is maintained within a second configuration file similar to the first-mentioned configuration file.

13. A method for designating and retrieving information over a computer network, comprising the steps of:

designating individual portions of a plurality of screens accessible over said computer network and maintained at diverse locations including an underlying information content associated therewith;

positioning said designated individual portions of said plurality of screens within a single display screen;

storing indicators indicative of the location of current and future updated information corresponding to said designated individual portions in a configuration file from a location at a centralized location;

retrieving said configuration file apart from said centralized location; and displaying on a display screen current and future updated information corresponding to said designated individual portions and said underlying information content associated with each of said designated individual portions in accordance with said configuration file, said underlying information content corresponding to said indicators being retrieved and updated from over said computer network each time said configuration file is retrieved.

14. The method of claim 13, wherein said plurality of screens are webpages downloaded from the world wide web via the internet.

15. The method of claim 13, wherein said configuration file is retrieved by a wireless handheld device.

16. The method of claim 13, further comprising the step of updating said underlying information content associated with each of said designated individual portions when retrieved.

17. A method for designating and retrieving information over the internet, comprising:

accessing a plurality of web pages;

designating individual portions of said plurality of web pages maintained at diverse locations, each of said individual portions being associated with an underlying information content;

positioning said designated individual portions of said plurality of web pages within a single configuration display screen exhibiting a format;

storing the format of said single configuration display screen including indicators indicative of the location of current and future updated information corresponding to said designated individual portions of said at least one webpage in a configuration file at a centralized location;

retrieving said configuration file at a location positioned apart from said centralized location;

retrieving and updating current and future updated information corresponding to said underlying information content associated with each of said designated individual portions and corresponding to said indicators from over the internet each time said configuration file is retrieved; and positioning said designated individual portions and said associated underlying information content in accordance with said configuration file on an output display screen.

18. The method of claim 17, wherein said configuration display screen resides on a desktop computer system.

19. The method of claim 17, wherein said output display screen comprises a display screen on a wireless handheld access device.

20. The method of claim 17, further comprising the step of storing said configuration file on a central server separate from said configuration display screen and said output display screen.

21. The method of claim 17, further comprising the step of including world wide web hypertext links within said configuration display screen.

22. The method of claim 21, wherein said hypertext links allow a user to access additional world wide web information.

23. The method of claim 17, further comprising the step of including links within said configuration display screen to provide access to at least one further user-defined configuration display screen in a hierarchical manner.

24. The method of claim 23, wherein the format of said at least one further user-defined configuration display screen is maintained within said configuration file.

25. The method of claim 23, wherein the format of said at least one further user-defined configuration display screen is maintained within a second configuration file similar to the first-mentioned configuration file.

26. A system for designating information to be retrieved over a computer network, comprising:

means for designating individual portions of a plurality of screens accessible over said computer network and maintained at diverse locations including an underlying information content;

means for positioning said designated individual portions of said plurality of screens within a single display screen; and means for storing indicators indicative of the location of current and future updated information corresponding to said designated individual portions at a location positioned apart from a centralized location in a configuration file positioned at said centralized location, said underlying information content corresponding to said indicators being retrieved and updated from over said computer network each time said configuration is to be retrieved.

27. The system of claim 26, wherein said plurality of screens accessible over said computer network are webpages downloaded from the world wide web via the internet.

28. A system for designating information to be retrieved over the internet, comprising:

means for accessing a plurality of web pages;

means for designating individual portions of said plurality of web pages maintained at diverse locations, each of said individual portions being associated with an underlying information content;

means for positioning said designated individual portions of said plurality of web pages within a single configuration display screen; and means for storing the format of said single configuration display screen including indicators indicative of the location of current and future updated information corresponding to said designated individual portions of said at least one webpage at a location positioned apart from a centralized location in a configuration file positioned at said centralized location, said underlying information content corresponding to said indicators being retrieved and updated from over the internet each time said configuration file is retrieved.

29. The system of claim 28, wherein said configuration display screen resides on a desktop computer system.

30. The system of claim 28, wherein said configuration file is stored on a central server separate from said configuration display screen.

31. The system of claim 28, further comprising means for including world wide web hypertext links within said configuration display screen.

32. The system of claim 28, further comprising means for including links within said configuration display screen indicative of at least one further user-defined configuration display screen in a hierarchical manner.

33. The system of claim 32, wherein the format of said at least one further user-defined configuration display screen is maintained within said configuration file.

34. The system of claim 32, wherein the format of said at least one further user-defined configuration display screen is maintained within a second configuration file that is similar to the first-mentioned configuration.

35. A method for designating information to be retrieved over a computer network, comprising the steps of:
   designating individual portions of plurality of screens accessible over said computer network and maintained at diverse locations including an underlying information content;
   positioning said designated individual portions of said plurality of screens within a single display screen; and
   storing said designated individual portions at a location positioned apart from a centralized location in a configuration file positioned at said centralized location, said underlying information content corresponding to said indicators being retrieved and updated from over said computer network each time said configuration is to be retrieved.

36. The method of claim 35, wherein said plurality of screens are webpages downloaded from the world wide web via the internet.

37. A method for designating and retrieving information over the internet, comprising:
   accessing a plurality of web pages;
   designating individual portions of said plurality of web pages maintained at diverse locations, each of said individual portions being associated with an underlying information content;
   positioning said designated individual portions of said plurality of web pages within a single configuration display screen; and
   storing the format of said single configuration display screen including indicators indicative of the location of current and future updated information corresponding to said designated individual portions of said at least one webpage at a location positioned apart from a centrlized location in a configuration file positioned at said centralized location, said underlying information content corresponding to said indicators being retrieved and updated from over the internet each time said configuration file is retrieved.

38. The method of claim 37, wherein said configuration display screen resides on a desktop computer system.

39. The method of claim 37, further comprising the step of storing said configuration file on a central server separate from said configuration display screen.

40. The method of claim 37, further comprising the step of including world wide web hypertext links within said configuration display screen.

41. The method of claim 37, further comprising the step of including links within said configuration display screen indicative of at least one further user-defined configuration display screen in a hierarchical manner.

42. The method of claim 41, wherein the format of said at least one further user-defined configuration display screen is maintained within said configuration file.

43. The method of claim 41, wherein the format of said at least one further user-defined configuration display screen is maintained within a second configuration file that is similar to the first-mentioned configuration file.

* * * * *